United States Patent [19]

Denber

[11] Patent Number: 5,483,606
[45] Date of Patent: Jan. 9, 1996

[54] METHOD FOR AUTOMATICALLY REGISTERING A DOCUMENT HAVING A PLURALITY OF PAGES

[75] Inventor: Michel J. Denber, Rochester, N.Y.

[73] Assignee: Xerox Corporation, Stamford, Conn.

[21] Appl. No.: 176,181

[22] Filed: Jan. 3, 1994

[51] Int. Cl.⁶ .................................................. G06K 9/00
[52] U.S. Cl. ............................................ 382/294; 395/117
[58] Field of Search .................................. 382/44, 45, 46, 382/112, 292, 293, 294, 295; 395/111, 117; 348/94, 95

[56] References Cited

U.S. PATENT DOCUMENTS

| | | | |
|---|---|---|---|
| 3,872,433 | 3/1975 | Holmes et al. | 340/146.3 AH |
| 4,635,293 | 1/1987 | Watanabe | 382/44 |
| 4,672,462 | 6/1987 | Yamada | 358/280 |
| 5,054,098 | 10/1991 | Lee | 382/46 |
| 5,073,957 | 12/1991 | Seto et al. | 382/22 |
| 5,086,346 | 2/1992 | Fujisawa | 358/453 |
| 5,086,482 | 2/1992 | Kumagai | 382/25 |
| 5,129,014 | 7/1992 | Bloomberg | 382/48 |
| 5,223,939 | 6/1993 | Imaizumi et al. | 358/296 |
| 5,271,065 | 12/1993 | Rourke et al. | 382/1 |
| 5,285,504 | 2/1994 | Pavlidis et al. | 382/9 |

FOREIGN PATENT DOCUMENTS

| | | | |
|---|---|---|---|
| 60-164871 | 8/1985 | Japan | 382/45 |

*Primary Examiner*—Leo H. Boudreau
*Assistant Examiner*—Andrew W. Johns
*Attorney, Agent, or Firm*—Lloyd F. Bean, II

[57] ABSTRACT

A method for automatically registering documents being copied on an electronic reprographic copier. The registration of the document is based on the actual image content being copied, not the sheet it is on. A first document having original image content is scanned. The original image is processed. A boundary enclosing the original image content of the first document is identified. The boundary is identified by computing a quadratic convex hull of the original image. A second and subsequent documents having image content are scanned and processed. The image content of the second and subsequent documents are positioned within the boundary according to one of the following classes of registration: absolute registration, global fit relative registration or local fit relative registration.

19 Claims, 4 Drawing Sheets

Typography is closely allied to the fine arts, and types have always reflected the taste or feeling of their times.

The charm of the early Italian types has perhaps never been equalled

METHOD FOR AUTOMATICALLY REGISTERING A DOCUMENT HAVING A PLURALITY OF PAGES

FIELD OF THE INVENTION

The invention relates generally to image processing and more specifically to a technique for registering images, typically for further processing.

BACKGROUND OF THE INVENTION

It is frequently desirable when copying documents to have the output image content aligned in a particular way on the page, for example to provide room for binding or to center the image content on the page. Some copiers (such as the Xerox 9700) have an user-selectable "margin shift" feature that allows offsetting the image content by either a fixed or variable amount in which the user can select (via a dial) some particular distance, and then that same distance will be applied to every page. However, this assumes that all of the originals being copied are similarly registered to work properly. Other copiers (such as the Canon CLC-500) offer an automatic center shift feature. However, this works by detecting a white border around the page being copied and thus moves the entire page, rather than the image content on the page. Both of these examples are instances of absolute registration, i.e. image displacement to a fixed, known position. Neither of the example solutions is capable of dealing with a related problem, relative registration. In relative registration, it is desired to find the best match of a given image content to some reference image content, without any a priori information as to the position of the reference image content.

A simple, relatively inexpensive, and accurate approach to register images in such printing systems has been a goal in the design, manufacture and use of printers. The need to provide accurate and inexpensive registration has become more acute, as the demand for high quality, relatively inexpensive images has increased.

Various techniques for registering images have hereinbefore been devised as illustrated by the following disclosures, which may be relevant to certain aspects of the present invention:

U.S. Pat. No. 5,129,014

Patentee: Bloomberg

Issued: Jul. 7, 1992

U.S. Pat. No. 5,086,482

Patentee: Kumagai

Issued: Feb. 4, 1992

U.S. Pat. No. 5,129,014 discloses a technique for rapidly and efficiently registering binary images, contemplates incorporating one or more reference features, referred to as fiducials, into the binary image at a known displacement from a feature of interest in the image, subjecting the image to an operation (typically a morphological operation and possibly a thresholded reduction) that projects out the fiducial(s), determining the position of the fiducial(s), and thereby determining the position of the feature of interest. The fiducial(s) must have at least one characteristic that is absent from the remaining or at least from neighboring) portions of the image. In one set of embodiments, each fiducial includes horizontal and vertical line segments that are longer than any line segments expected to be found in the binary image. Projecting out the fiducial entails erosions using hit-miss structuring elements. In another embodiment, each fiducial is a small finely textured region.

U.S. Pat. No. 5,086,482 discloses an image processing method for generating a convex hull of a configuration in a digital image. Top points of the convex hull are selected. A reference line connecting the top points is defined. For each area between two adjacent top points, continuous pixels are selected from one top point toward the other so that each pixel is the nearest to the reference line as well as between the reference line and a contour of the configuration. Distances from pixels to the reference line are calculated from chain codes.

SUMMARY OF THE INVENTION

In accordance with the invention there is provided a method of processing one or more pages in a printing system comprising the steps of scanning a first page having first image content, and generating a boundary defining a positional relationship between the first image content and the first page. A second image content is outputted to a second page with the position of the second image content on the second page being a function of the boundary.

Pursuant to another aspect of the invention, there is provided a method for automatically registering a document having a plurality of pages with image content to be printed by an electronic reprographic system, the method comprises the steps of scanning a first page having original image content with a scanner, and generating an electronic representation of the page with the original image content being enclosed by a designated area. A second page having original image content is scanned with the scanner and the original image content of the second page is registered in the designated area.

These and other aspects of the invention will become apparent from the following description used to illustrate a preferred embodiment of the invention read in conjunction with the accompanying drawings.

Figure 1:
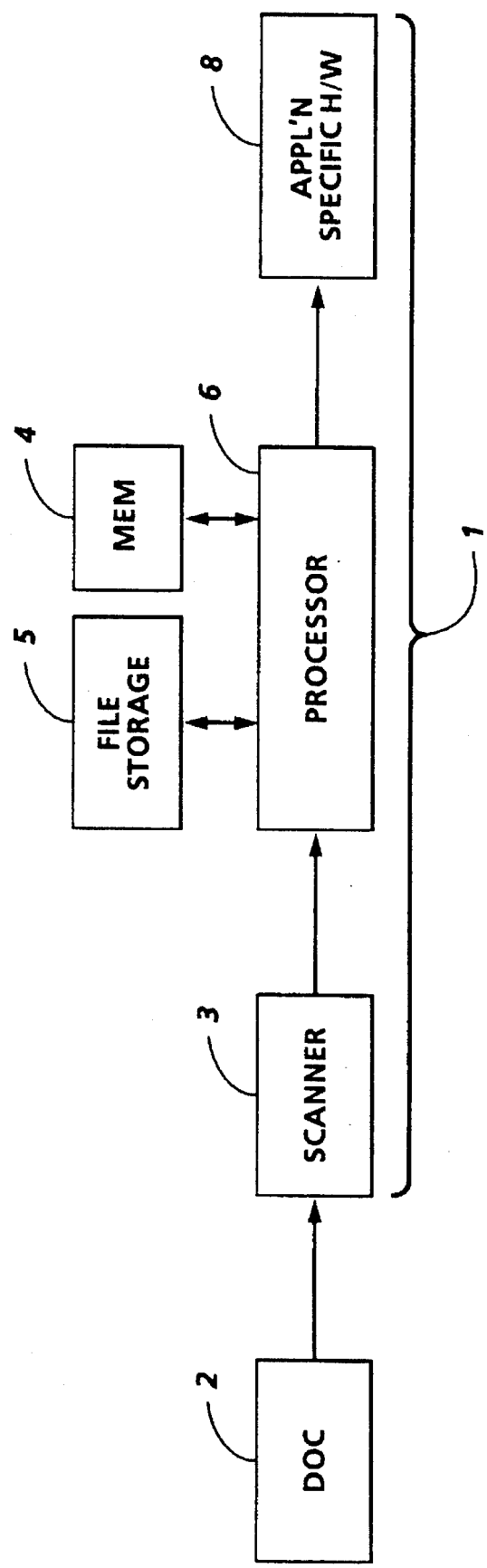
FIG. 1 is a block diagram of an image scanning and processing system incorporating the present invention.

While the present invention is described primarily in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. Also, Pixels (sometimes referred as image signals) are signals representing optical density of the image of a discrete areas in a document. It should be noted that the designation of black as ON and white as OFF reflects the fact that most documents of interest have a black foreground and a white background. While the techniques of the present invention could be applied to negative images as well, the discussion will be in terms of black on white.

"Image content" is an area of a document containing "text" or "line graphics".

A "solid region" of an image refers to a region extending many pixels in both dimensions within which substantially all the pixels are ON.

A "textured region" of an image refers to a region that contains a relatively fine-grained pattern. Examples of textured regions are half-toned or stippled regions.

"Text" refers to portions of a document or image containing letters, numbers, or other symbols including non-alphabetic linguistic characters.

"Line graphics" refers to portions of a document or image composed of graphs, figures, or drawings other than text, generally composed of horizontal, vertical, and skewed lines having a substantial run length as compared to text. Graphics could range from horizontal and vertical lines in an organization chart to more complicated horizontal, vertical, and skewed lines in engineering drawings.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an NXN square of pixels, all having the same value as the original pixel.

"Reduction" is a scale operation characterized by a SCALE factor N and a threshold LEVEL M. Reduction with SCALE=N entails dividing the source image into NXN squares of pixels, mapping each such square in the source image to a single pixel on the destination image. The value for the pixel in the destination image is determined by the threshold LEVEL M, which is a number between 1 and N sup 2. If the number of ON pixels in the pixel square is greater or equal to M, the destination pixel is ON, otherwise it is OFF.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care", are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2X2 SE is a 2X2 square of ON pixels. A solid SE need not be rectangular.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

The various operations defined above are sometimes referred to in noun, adjective, and verb forms. For example, references to erosion (noun form) may be in terms of eroding the image or the image being eroded (verb forms) or the image being subjected to a erosion operation (adjective form). No difference in meaning is intended.

FIG. 1 is a block diagram of an image analysis system 1 within which the present invention may be embodied. The basic operation of system 1 is to extract or eliminate certain characteristic portions of document 2. To this end, the system includes a scanner 3 which digitizes the document on a pixel basis, and provides a resultant data structure, typically referred to as an image. Depending on the application, the scanner may provide a binary image (a single bit per pixel) or a gray scale image (a plurality of bits per pixel). The image contains the raw content of the document, to the precision of the resolution of the scanner. The image may be sent to a memory 4 or stored as a file in a file storage unit 5, which may be a disk or other mass storage device.

A processor 6 controls the data flow and performs the image processing, including for example, the automatic document registration processing of the present invention. Processor 6 may be a general purpose computer, a special purpose computer optimized for image processing operations, or a combination of a general purpose computer and auxiliary special purpose hardware. If a file storage unit is used, the image is transferred to memory 4 prior to processing. Memory 4 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 8, which may be a printer or display, or may be written back to file storage unit 5.

The foregoing description should be sufficient to illustrate the general operation of an image analysis system.

The features of the present invention will now be discussed in greater detail with reference to FIG. 5 of the drawings.

Figure 5:
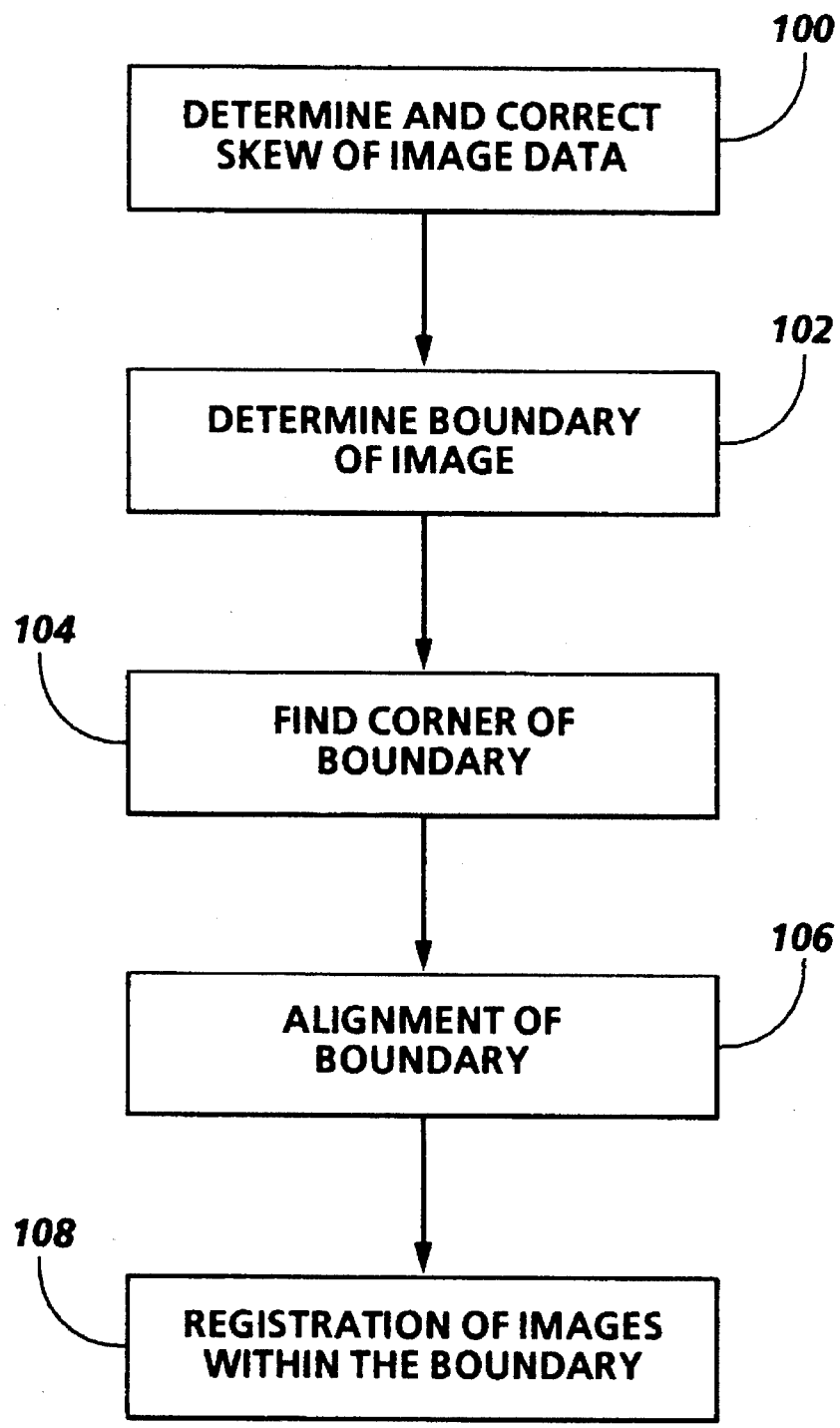
FIG. 5 is a block diagram of the processor of the present invention.

FIG. 5 is a block diagram of processor 6, at step 100 the skew of the original image content is determined. Lines of the bitmap are scanned and a variance in the number of ON pixels as a function of skew angle is calculated. Skew of a document image occurs when the variance is a maximum. Efficient means for calculating skew of a document is known for example, U.S. Pat. No. 5,187,753 to Bloomberg et al., assigned to Xerox Corporation and issued on Feb. 16, 1993, is hereby incorporated herein by reference thereto. Once the skew has been identified, the original image is deskewed. Skew correction is achieved by rotating the image. Efficient means for rotating an image using bitblt (i.e. raster operations) are known and discussed in for example, Paeth, "A Fast Algorithm for Fast Raster Rotation," Vision Interface '86, Vancouver B.C., May 1986, pg. 77–81, which is incorporated by reference herein.

Figures 2A, 2B, 2C, 2D:
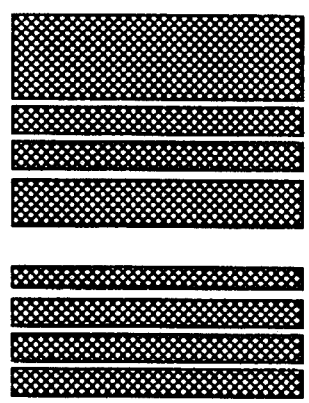
FIG. 2A illustrates a text document image to be processed by the present invention.
FIG. 2B–2D illustrates a first mode of processing the text document image by the present invention.
Figure 3:
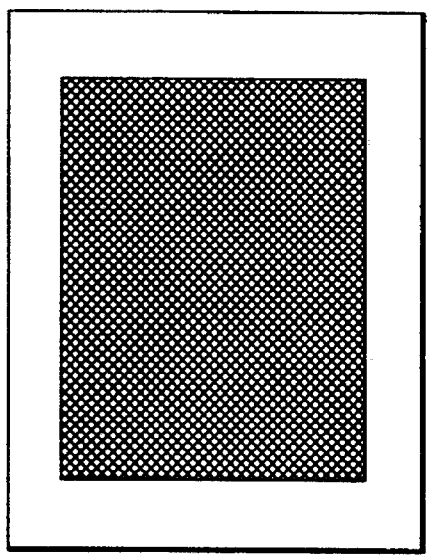
FIG. 3 illustrates a second mode of processing the text document image of FIG. 2D by the present invention.
Figure 4:
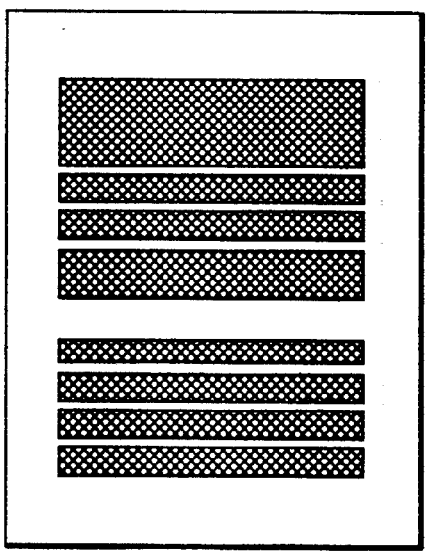
FIG. 4 illustrates a third mode of processing the text document images of FIG. 2D and FIG. 3 by the present invention.

At step 102, the boundary enclosing the original image content is determined, (referred as generating a quadratic convex hull). The boundary is determined by iteratively ORing individual pixels of the original image with the adjacent pixel, laterally across the page from left to right as shown in FIGS. 2A, 2B and 2C producing the result in FIG. 2D. Next, the same process is carried out vertically starting with the image in FIG. 2D as input producing the result in FIG. 3. Next, the quadratic convex hull is determined by ANDing the laterally and vertically ORed images producing the result in FIG. 4. Note that since the final result contains more than one solid region, it is not truly a hull in the strict sense.

At step 104, the coordinates of the corners of the hull are located, for example by raster scanning from left to right and from top to bottom the hull produced in step 102 until a non-zero pixel is encountered.

Once the corners of the hull are located at step 104, a second and subsequent documents are scanned and processed (i.e.. deskewed) and are aligned within the hull at step 106. For example, as describe so far, in a set of n images, the first scanned document is taken to be the original image and all subsequent images are aligned to it. In this case, the position of the first image is "not" changed. Alternatively, in a set of n images, all of the image locations can be changed, and if desired registered to a fixed location. The alignment is accomplished by determining the amount of adjustment necessary to shift the hull to a desired location, and then applying an equivalent shift to all pixels in the original image and subsequent images. This location may either be selected by the user in some manner (such as via dials, mouse, light pen, or other similar device), or preset to some known value by the machine (such as "upper-left corner" or "center")

At step 108 the original image and subsequent images are registered in relation to each other. For example if absolute registration was desired. The following function is employed, the input bit stream of the image in FIG. 2D and the first scan line with non-zero pixels is monitored and the lowest numbered non-zero pixel over all scan-lines is registered with the top and left margins respectively. It has been found that this method maybe susceptible to single-pixel image noise. In cases where this occurs, a morphological erosion can be performed on the image to eliminate single isolated pixel before determining the boundary (i.e. hull).

If relative registration is desired, one must select either local fit or global fit. Global fit is defined as positioning the image to be registered in such a way that it maximally overlaps the boundary of the reference image. Local fit is more restrictive. It is defined as positioning the image to be registered in such a way that it maximally over laps the reference image itself. In the present invention for global fit, the "input image" is the quadratic convex hull computed in FIG. 2D, while for local fit, the input image is the actual scanned-in image data (FIG. 2A). Basically, global fit is the maximum overlap of the outlines of the two images (the reference image and the incoming data image to be registered), whereas local fit is the maximum overlap of the actual image features, even if that results in a less-than-ideal overlap of the boundaries. For some images, both processes might yield the same result. However, both are computed using the same function:

1. The input image is logically AND'ed with the reference image (or its boundary) and the resulting number of pixels is counted.

2. The input image is displace by one pixel horizontally and step 1 is repeated. If the new pixel count is greater than the previous one, the current x-location is saved 3. Step 2 is repeated across the width of the page.

4. The input image is then positioned at the location that yielded the highest pixel count and step 1–3 are repeated vertically. The resulting y-location will yield the position of best registration for the input image.

It should be appreciated that relative registration can be placed under user control by providing an appropriate interface, such as a CRT and mouse. The user can sweep out a region at some place in the image to be used to control registration. For example, it might be desired to register all pages specifically to the location of a chapter heading. The input image would then be moved about the page looking for the best match within the user-defined region with the system providing realtime feedback as to how desirable the match is as at any given time.

It should be evident that overlap of image data of the second and subsequent documents which are positioned within the boundary could be improved if desired by reducing or expanding image pixels. This could be particularly desirable for registering line graphics documents with each other or with text documents.

It is, therefore, apparent that there has been provided a method for registering images in accordance with the present invention, that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of processing pages in a printing system, comprising:

scanning a first page having first image content;

generating a boundary enclosing substantially all of the first image content, said generating step includes defining points along the boundary of the first image content relative to the first page, said defining step comprising:

computing a quadratic convex hull of the first image content of the first page to define the boundary by laterally ORing adjacent pixels to obtain a laterally ORed image, vertically ORing adjacent pixels to obtain a vertically ORed image and logically ANDing the laterally and vertically ORed images; and locating the coordinates of the corners of the boundary; and outputting second image content to a second page with substantially all of the second image content position on the second page being within the boundary.

2. The method of claim 1, wherein said computing step comprising the steps of:

ORing individual horizontal pixels of the first page with the adjacent horizontal pixel to produce a horizontally ORed image;

ORing individual vertical pixels of the first page with the adjacent vertical pixel to produce a vertically ORed image; and ANDing the horizontally ORed image and the vertically ORed image together.

3. The method of claim 1, further comprising the step of moving the boundary to a desired location on the first page before said outputting step.

4. The method of claim 1, further comprising the step of processing the first page to determine skew of first image content before said generating step.

5. The method of claim 4, wherein said processing step comprising the steps of:

calculating the skew of the image content on the first page; and rotating the image content on the first page so that it is deskewed.

6. The method of claim 1, wherein said outputting step includes the step of applying a global fit relative registration function to the second image content.

7. The method of claim 1, wherein said outputting step includes the step of applying a global fit relative registration function to the second image content and the boundary of said generating step.

8. The method of claim 1, wherein said outputting step includes the step of applying a local fit relative registration function to the first image content of the first page and the second image content.

9. The method of claim 1, further comprising the step of storing the boundary of said generating step in a storage device.

10. A method for automatically registering a document having a plurality of pages with image content to be printed on an electronic reprographic system, comprising:

scanning a first page having original image content with a scanner;

generating an electronic representation of the first page with the original image, said generating step including the step of defining selected points along a designated area relative to the first page; said defining step comprising:

computing a quadratic convex hull of the original image content of the first page to define the designated area by laterally ORing adjacent pixels to obtain a laterally ORed image, vertically ORing adjacent pixels to obtain a vertically ORed image and logically ANDing the laterally and vertically ORed images; and locating the coordinates of the corners of the designated area;

enclosing substantially all of the original image content of the electronic representation of the first page within the designated area;

scanning a second page having image content with the scanner; and registering substantially all of the image content of the second page in the designated area.

11. The method of claim 10, wherein said computing step comprising the steps of:

ORing individual horizontal pixels of the first page with the adjacent horizontal pixel to produce a horizontally ORed image;

ORing individual vertical pixels of the first page with the adjacent vertical pixel to produce a vertically ORed image; and ANDing the horizontally ORed image and the vertically ORed image together.

12. The method of claim 10, further comprising the step of:

moving the designated area to a desired location on the electronic page before said registering step.

13. The method of claim 10, further comprising the step of processing the first page to determine skew of first image content before said generating step.

14. The method of claim 13, wherein said processing step comprising the steps of:

determining the skew of the original image content on the first page; and rotating the original image content on the first page so that it is deskewed.

15. The method of claim 10, wherein said registering step includes the step of applying an absolute registration function to the image content of the second page.

16. The method of claim 10, wherein said registering step includes the step of applying a global fit relative registration function to the image content of the second page and the designated area of said enclosing step.

17. The method of claim 10, wherein said registering step includes the step of applying a local fit relative registration function to the first image content of the first image and the image content of the second page.

18. The method of claim 10, further comprising the step of storing the representation of the electronic page of said generating step in a storage device.

19. The method of claim 10, further comprising the step of printing the electronic page having image content of the second page in the designated area with a printer after said registering step.

* * * * *